SUPERREGENERATIVE RECEIVER

Filed Jan. 28, 1948

INVENTOR
Winfield R. Koch
BY Philip [illegible]
ATTORNEY

SUPERREGENERATIVE RECEIVER

Filed Jan. 28, 1948 2 SHEETS—SHEET 2

INVENTOR
Winfield R. Koch
BY [signature]
ATTORNEY

Patented Dec. 25, 1951 2,580,028

UNITED STATES PATENT OFFICE 2,580,028

SUPERREGENERATIVE RECEIVER

Winfield R. Koch, Marlton, N. J., assignor to Radio Corporation of America, a corporation of Delaware Application January 28, 1948, Serial No. 4,872

2 Claims. (Cl. 250—20)

This invention relates to super-regenerative receivers, and particularly to regenerative amplifiers having either self-quenching or separate quenching action suitable particularly for use in an angle-modulated carrier-wave receiver, as well as to novel methods of demodulating a modulated carrier wave by regeneration.

Super-regenerative receivers including a regenerative detector are well known in the art. A regenerative detector may be of the self-quenching type wherein a circuit such as a resistor-condenser network is provided to interrupt or quench the regeneration of the input wave preferably at a super-audible frequency, or a separate quench oscillator may be provided for periodically interrupting the regeneration of the input wave at a super-audible frequency. In accordance with conventional practice the output current of a regenerative detector is integrated, thereby to demodulate directly the modulated carrier wave and to derive the modulation signal. A super-regenerative receiver may be utilized for receiving either an angle-modulated or an amplitude-modulated (AM) carrier wave. If an angle-modulated or frequency-modulated (FM) carrier wave is received, the signal input circuit of the regenerative detector is tuned slightly off the mean or center frequency so that the signal input circuit functions as a frequency-discriminator network.

A regenerative detector, accordingly, develops directly the modulation signal. On the other hand, in United States Patent No. 2,410,981 granted on November 12, 1946, to W. R. Koch and entitled "Super-Regenerative Receiver Circuits" a regenerative amplifier of the self-quenching type has been disclosed for use in a super-regenerative receiver. It has been shown therein that the quench current derived from a regenerative amplifier of the self-quenching type is frequently modulated in accordance with the angle or amplitude modulation of the input carrier wave, and that this frequency-modulated quench current may be transformed by a frequency-discriminator network into a corresponding amplitude-modulated quench current which may subsequently be detected by a separate detector. This may be effected by mistuning the detector input circuit. In such a system, the tuning of the regenerative amplifier input circuit and of the detector input circuit are mutually dependent. It may be necessary to adjust the tuning of the two input circuits repeatedly before the modulation signal may be properly reproduced.

It is, accordingly, an object of the present invention to provide an improved receiver embodying a regenerative amplifier and a separate detector in which the tuning of the amplifier input circuit is independent of the tuning of the detector input circuit.

Another object of the present invention is to provide a novel method of demodulating either an angle-modulated or an amplitude-modulated carrier wave by regeneration.

Still another object of the present invention is to provide an improved converter including a regenerative amplifier for converting directly an angle-modulated or amplitude-modulated ultra-high frequency wave into an amplitude-modulated low-frequency wave without the necessity of switching or adjusting any circuit elements other than tuning the receiver to the proper wave.

A further object of the invention is to provide a simplified "FM adaptor" for receiving angle-modulated carrier waves with a conventional amplitude-modulated carrier-wave receiver.

A still further object is to provide such an adaptor which utilizes either a self-quenching regenerative amplifier or a regenerative amplifier employing a separate quench oscillator to develop a modulated quench current, a harmonic of which is applied to the input circuit of a conventional broadcast band AM receiver for further amplification and subsequent detection.

Still another object of the invention is to provide, for an amplitude-modulated carrier-wave receiver, a simple, inexpensive adaptor for receiving angle-modulated carrier waves wherein the high-frequency angle-modulated carrier wave is directly translated into a modulated low-frequency quench current which may be reproduced by the amplitude-modulated carrier-wave receiver.

In brief, a super-regenerative receiver for demodulating a modulated carrier wave in accordance with the present invention comprises a regenerative amplifier on which the modulated carrier wave is impressed. A quench oscillator is coupled to the regenerative amplifier for periodically initiating and interrupting regeneration of the carrier wave at a predetermined frequency which is preferably a super-audible frequency. A quench frequency current is consequently derived from the regenerative amplifier which has its amplitude modulated in response to variations of the amplitude of the carrier wave. The amplitude-modulated quench current may then be applied to a detector and demodulated to derive the modulation signal corresponding to the modulation originally present on the carrier wave. One important advantage of the present system is that the tuning of the detector input circuit is independent of the tuning of the regenerative amplifier input circuit because the frequency of the quench current is not varied by the signal modulation.

Further, in accordance with the present invention, a harmonic of the modulated quench current may be selected which may then be further amplified and detected. A super-regenerative receiver of this type may, with advantage, be utilized as an adaptor for a conventional amplitude-modulated carrier-wave broadcast receiver. In that case, the super-regenerative receiver may have either a self-quenching regenerative amplifier or a regenerative amplifier of the type employing a separate quenching oscillator.

In accordance with the present invention a method of demodulating a modulated carrier wave comprises the steps of regenerating the carrier wave and cyclically interrupting the regeneration at a constant frequency which preferably is a super-audible frequency to produce a quench current whose amplitude is determined by the amplitude of the carrier wave. Finally the amplitude-modulated quench current is demodulated to develop the modulation signal.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1:
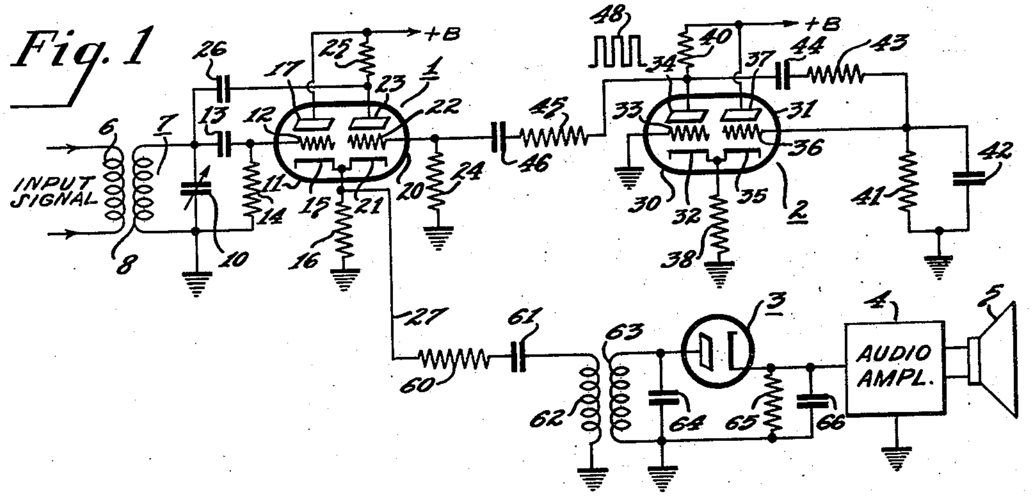
Fig. 1 is a circuit diagram of a super-regenerative receiver embodying the present invention and including a regenerative amplifier of the type having a separate quench oscillator.

Referring now to the drawings and particularly to Fig. 1, there is illustrated a super-regenerative receiver including regenerative amplifier 1 which is controlled by quench oscillator 2. As will be explained in detail hereinafter, the quench current derived from regenerative amplifier 1 has its amplitude modulated in accordance with the received signal. The modulation signal which may be an audio signal, is derived from detector 3. The audio signal may be amplified by audio amplifier 4 and reproduced by loud speaker 5.

The input signal is impressed upon primary coil 6. The input signal may either be an amplitude-modulated carrier wave, or alternatively, an angle-modulated carrier wave. In the latter case the input signal may be transformed into a corresponding amplitude-modulated carrier wave by detuning input circuit 7 from the mean carrier frequency so that it functions as a frequency-discriminator network. As used herein, the generic expression "angle modulation" or "angle-modulated wave" is intended to include either frequency or phase modulation or a modulation which contains components resembling both frequency and phase modulation and is, therefore, a hybrid modulation.

Input circuit 7 includes secondary coil 8 inductively coupled to primary coil 6, and condenser 10 which may be variable, as shown. Input circuit 7 has its high alternating-potential terminal connected to control grid 12 of amplifier section 11 by grid coupling condenser 13 by-passed to ground by grid leak resistor 14. Amplifier section 11 further includes cathode 15 connected to ground through cathode resistor 16 and anode 17 connected to a suitable positive voltage source indicated at +B. Regenerative amplifier 1 includes another amplifier section 20 having cathode 21, control grid 22 and anode 23. Cathode 21 is connected to cathode 15. Grid leak resistor 24 is connected between control grid 22 and ground. Anode 23 is connected to the positive voltage source +B through anode resistor 25. Anode 23 is coupled to control grid 12 through blocking condenser 26 and grid coupling condenser 13. The output signal may be derived across cathode resistor 16 and obtained from lead 27.

Regenerative amplifier 1 including amplifier sections 11 and 20 is controlled by quench oscillator 2 comprising oscillator sections 30 and 31. Oscillator section 30 includes cathode 32, control grid 33 and anode 34 while oscillator section 31 is provided with cathode 35, control grid 36, and anode 37. Cathodes 32 and 35 are tied together and connected to ground through common cathode resistor 38. Control grid 33 is grounded as shown while anode 34 is connected to the positive voltage supply +B through anode resistor 40. Anode 37 is directly connected to the positive voltage supply +B. Control grid 36 is connected to ground through resistor 41, bypassed by condenser 42. Resistor 43 and condenser 44, arranged in series, connect anode 34 to control grid 36. Anode 34 of quench oscillator 2 is connected to control grid 22 of regenerative amplifier 1 through resistor 45 and condenser 46 arranged in series.

As previously explained, the input signal impressed upon input circuit 7 may be an amplitude-modulated carrier wave. In that case, input circuit 7 is tuned to the frequency of the amplitude-modulated wave. Alternatively, an angle-modulated carrier wave may be impressed upon input circuit 7. Input circuit 7 may now be tuned to a frequency which is off the center frequency of the carrier wave so that the slope of the resonant curve of the input circuit will transform the angle-modulated carrier wave into a corresponding amplitude-modulated carrier wave in the manner explained in the Koch patent referred to above. Input circuit 7 now functions as a frequency-discriminator network.

Regenerative amplifier 1 and its quench oscillator 2 operate in the following manner. Let it be assumed that oscillator section 31 is conducting space current at an increasing rate. The current thus flowing through cathode resistor 38 will raise the potential of both cathodes 32 and 35. Since control grid 33 is always at ground potential, the higher potential of cathode 32 will prevent oscillator section 30 from conducting space current. Quench oscillator 2 operates in the manner of a relaxation oscillator, and accordingly, the current through oscillator section 31 increases until the discharge suddenly stops. In the absence of space current through oscillator sections 30 and 31, the potential of cathode 32 approaches ground potential, thereby permitting space current to flow through oscillator section 30. The current now flowing through anode resistor 40 causes a voltage drop thereacross which is impressed through coupling condenser 44 and resistor 43 on control grid 36, thereby preventing oscillator section 31 from conducting space current.

A substantially square-topped series of pulses shown at 48 may be derived across anode resistor 40 and is impressed through filter resistor 45 and coupling condenser 46 on control grid 22 of amplifier section 20. The frequency of pulses 48 is determined by the circuit constants of the series network consisting of resistor 43, condenser 44, and the parallel network comprising resistor 41, condenser 42. In other words, the two networks consisting of resistor 43, condenser 44 and of resistor 41, condenser 42 function as a voltage divider and phaser shifter. At a certain frequency determined by the constants of the two networks, there will be no phase shift between the voltage of anode 34 and that of control grid 36. Quench oscillator 2 will oscillate at that frequency for controlling the regeneration of regenerative amplifier 1.

Whenever a positive pulse 48 developed across anode resistor 40 is impressed upon control grid 22, amplifier section 20 will conduct space current. At that time space current may also flow through amplifier section 11 under the control of the input signal. Hence, amplifier sections 11 and 20 both conduct space current and amplifier 1 may oscillate. However, as soon as oscillator section 30 again conducts space current, a negative voltage is impressed upon control grid 22, which, in turn, will extinguish amplifier section 20. Accordingly, the voltage of anode 23 rises and this positive voltage is impressed through condensers 26 and 13 upon control grid 12 of amplifier section 11, thereby permitting the flow of space current through amplifier section 11. However, since amplifier section 20 is cut off, amplifier 1 can no longer oscillate. The regeneration of the modulated carrier wave impressed upon input circuit 7 is accordingly cyclically initiated and interrupted by quench oscillator 2, and its frequency is determined by the circuit constants of the oscillator.

The mode of operation of regenerative amplifier 1 may be explained by reference to Fig. 2 wherein the voltage of control grid 12 of amplifier section 11 is plotted against time. Thus, curve 50 indicates the direct current voltage of control grid 12. When amplifier section 20 is rendered conducting, the direct current of grid 12 becomes more negative as shown by curve 50. The regeneration of the modulated carrier wave will build up an oscillation in input circuit 7 at the carrier frequency which is superimposed on the direct current grid voltage as illustrated by curve 51. After a certain period of time determined by quench oscillator 2 and indicated by line 52 in Fig. 2, amplifier section 20 is rendered non-conductive. The direct current grid voltage 50 decreases exponentially with time at a rate determined by the time constants of coupling condenser 13 and grid leak resistor 14. During that time, the oscillation previously built up in input circuit 7 at the frequency of the input wave is rapidly damped because regenerative amplifier no longer oscillates and hence can no longer supply energy to input circuit 7.

Figure 2:
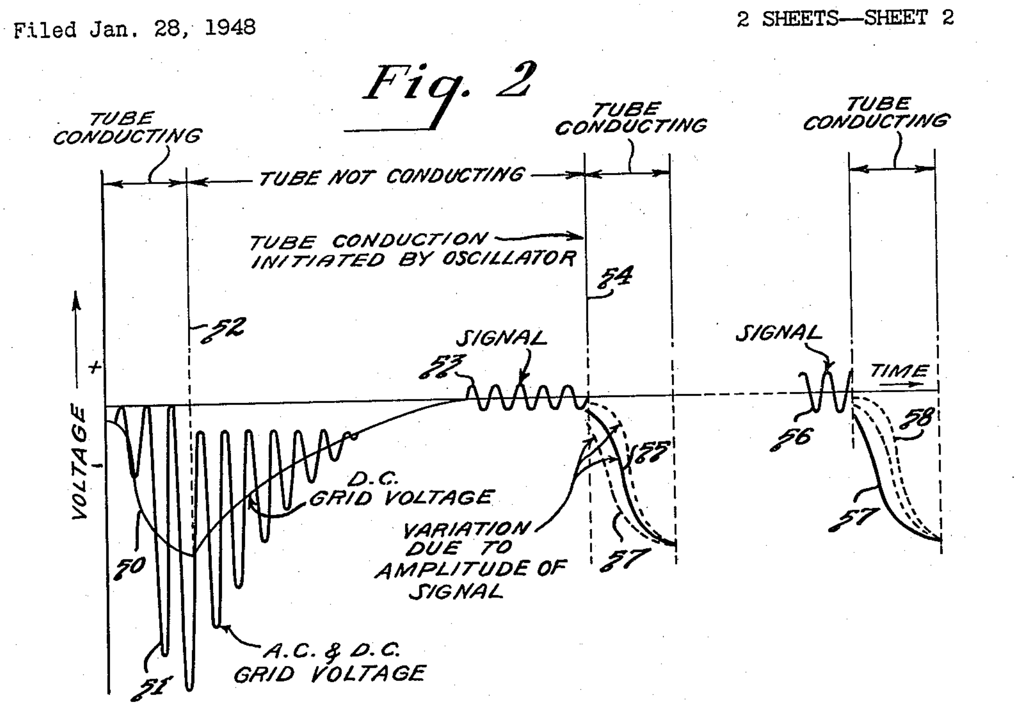
Fig. 2 is a graph showing curves referred to in explaining the operation of the regenerative amplifier of Fig. 1.

Curve 53 of Fig. 2 illustrates the modulated carrier wave which is impressed upon input circuit 7 and consequently on control grid 12. Although input wave 53 will be continuously impressed on control grid 12, it has only been shown for a portion of the quench cycle in order to avoid confusion. At a predetermined instant, shown by line 54, amplifier section 20 is again rendered conductive by quench oscillator 2 in the manner described hereinbefore. Thus, the time when amplifier section 20 becomes again conducting is determined solely by the frequency of pulses 48 developed by quench oscillator 2. On the other hand, the average or direct current grid voltage during the period of oscillation of amplifier section 11 depends on the amplitude of input wave 53. Thus, when the input wave has the amplitude illustrated at 53 in Fig. 2, the average grid voltage follows curve 55. On the other hand, when the amplitude of the input wave is larger as shown at 56, the average grid voltage is given by curve 57, and if the amplitude of the input wave should be smaller than that illustrated at 53, the average grid voltage would be given by dotted curve 58.

Since the average grid voltage determines the average quench current, it will be seen that the amplitude of the quench frequency current is modulated in accordance with the amplitude of the carrier wave impressed upon regenerative amplifier 1. If the time of conduction of amplifier section 20 is comparatively long as illustrated in Fig. 2, the average quench current will vary in accordance with the amplitude of the input wave. If, however, the time of conduction of amplifier section 11 is comparatively short, both the average and the peak quench current will vary in accordance with the amplitude of the modulated carrier wave impressed on input circuit 8.

The amplitude-modulated quench current may now be detected by detector 3. The modulated quench current derived from output lead 27 is filtered by resistor 60 and blocking condenser 61 connected to primary coil 62 having its low alternating-potential terminal connected to ground. Primary coil 62 is inductively coupled to secondary coil 63, tuned by condenser 64. The modulation signal is developed across load resistor 65 connected between the cathode of detector 3 and ground and may be bypassed for quench-frequency currents by condenser 66. The thus derived audio signal may then be amplified by audio amplifier 4 and reproduced by loud speaker 5.

In view of the fact that the quench current derived from regenerative amplifier 1 has its amplitude modulated, detector input circuit 63, 64 may be tuned to the quench frequency. Thus, the tuning of amplifier input circuit 7 and detector input circuit 63, 64 are independent of each other. The super-regenerative receiver in accordance with the present invention as illustrated in Fig. 1, therefore, has unexpected advantages over the super-regenerative receiver disclosed in the prior Koch patent. It is to be understood that any conventional quench oscillator may be substituted for quench oscillator 2.

Figure 3:
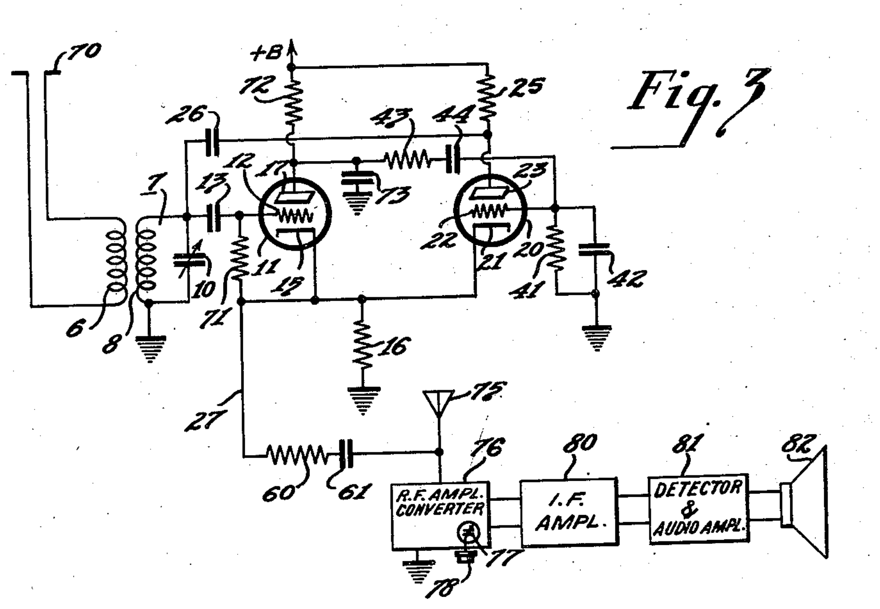
Fig. 3 is a circuit diagram of an angle-modulated carrier-wave adaptor and a conventional amplitude-modulated carrier-wave broadcast receiver shown in block form, the adaptor including a separate quench regenerative amplifier in accordance with the present invention.

Referring now to Fig. 3, in which like components have been designated by the same reference numerals as were used in Fig. 1, there is illustrated a super-regenerative converter in accordance with the present invention which may be utilized as an angle-modulated carrier-wave adaptor for an amplitude-modulated carrier-wave receiver. Regenerative amplifier 1 and quench oscillator 2 of Fig. 1 also functions as a super-regenerative convertor. The angle-modulated carrier wave may be intercepted by antenna 70 which, as illustrated, may be a dipole antenna arranged for receiving a high-frequency carrier wave.

The intercepted angle-modulated carrier wave is impressed on primary coil 6 inductively coupled to secondary coil 8 of input circuit 7, which may be tuned by variable condenser 10. The separate quench regenerative amplifier comprises amplifier sections 11 and 20 which may be separate triodes as illustrated, or twin triodes. Amplifier sections 11 and 20 simultaneously function as a regenerative amplifier and quench oscillator. Amplifier section 11 has its cathode 15 connected to ground through cathode resistor 16. The modulated carrier wave impressed upon input circuit 7 is impressed on control grid 12 through grid coupling condenser 13. Grid leak resistor 71 is connected between control grid 12 and cathode 15. Anode 17 of amplifier section 11 is connected to the positive voltage supply +B through anode resistor 72.

Amplifier section 20 has its cathode 21 tied to cathode 15 and connected to ground through cathode resistor 16. Control grid 22 is connected to ground through resistor 41, bypassed by condenser 42. Furthermore, control grid 22 is connected to anode 17 through the series combination of condenser 44 and resistor 43. The junction point between resistor 43 and anode 17 is bypassed to ground by carrier-frequency bypass condenser 73. Anode 23 of amplifier section 20 is connected to the positive voltage supply +B through anode resistor 25. Furthermore, anode 23 is coupled to control grid 12 by blocking condenser 26 and grid coupling condenser 13.

The separate quench regenerative amplifier 11, 20 functions essentially in the same manner as regenerative amplifier 1 and quench oscillator 2 of the circuit of Fig. 1. Thus, control grid 12 is grounded for currents at the quench frequency, that is, at the frequency developed by the quench oscillator. On the other hand, control grid 22 is grounded for currents at the frequency of the carrier wave. The quench frequency is again determined by the constants of the networks including the series combination of resistor 43, condenser 44, and the parallel combination of resistor 41 and condenser 42.

The quench current which has its amplitude modulated in accordance with the amplitude of the input wave may be derived across cathode resistor 16. The super-regenerative receiver of Fig. 3 preferably is arranged for receiving an angle-modulated carrier wave. In that case, input circuit 7 may be tuned off the center frequency of the carrier wave so that the circuit functions as a frequency-discriminator network.

The amplitude modulated quench current may be obtained from lead 27 connected to the junction point between cathodes 15, 21 and cathode resistor 16. The signal may be impressed upon antenna 75 of a conventional amplitude-modulated carrier-wave receiver through filter resistor 60 and blocking condenser 61.

The quench frequency preferably is superaudible and may be between approximately 20 and 50 kilocycles. Assuming that the quench frequency is 40 kilocycles, radio frequency amplifier and converter 76 may, for example, be tuned to the fourteenth harmonic of the quench frequency, that is, to 560 kilocycles or to any other desired harmonic. A large number of the harmonics of the quench frequency will fall within the tuning range of a conventional broadcast receiver. Once it has been determined which harmonic of the quench frequency will be utilized, variable condenser 77 may be tuned by tuning knob 78 to that frequency and need not be adjusted any more. Variable condenser 77 schematically indicates the tuning condenser of the input circuit of the radio frequency amplifier stage and of the local oscillator.

The intermediate frequency wave developed by converter 76 may be amplified by intermediate-frequency amplifier 80 and may then be detected and further amplified by detector and audio amplifier 81. The amplified audio signal may be reproduced by loud speaker 82.

It will thus be seen that when a regenerative amplifier having a separate oscillator is utilized as an angle-modulated carrier-wave adaptor, tuning of amplifier input circuit 7 will be independent of the tuning of variable condenser 77 which tunes the input circuit of the amplitude-modulated carrier-wave receiver. Since the entire amplification available in an amplitude-modulated carrier-wave receiver is utilized, the amplification of the super-regenerative adaptor need not be very large. It is also feasible to provide a radio-frequency amplifier stage ahead of the regenerative amplifier in order to minimize undesired radiation by the super-regenerative receiver.

Figure 4:
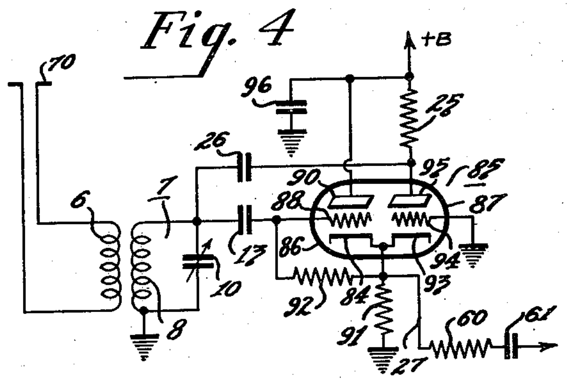
Fig. 4 is a circuit diagram of modified angle-modulated carrier-wave adaptor in accordance with the invention and including a self-quenching regenerative amplifier.

Referring now to Fig. 4, there is illustrated a super-regenerative receiver including a regenerative amplifier having self-quenching action. The receiver of Fig. 4 may also be used with advantage as an angle-modulated carrier-wave adaptor for a conventional amplitude-modulated carrier-wave receiver. Self-quenching regenerative amplifier 85 includes amplifier sections 86 and 87. Amplifier section 86 is provided with cathode 84, control grid 88 and anode 90. Cathode 84 is connected to ground through cathode resistor 91. The input signal impressed on input circuit 7 is impressed on control grid 88 through grid coupling condenser 13. Grid leak resistor 92 is connected between control grid 88 and cathode 84. Anode 90 is connected to a source of positive voltage indicated at +B.

Amplifier section 87 comprises cathode 93, control grid 94 and anode 95. Cathode 93 is tied to cathode 84 and connected to ground through cathode resistor 91. Control grid 94 is connected to ground while anode 95 is connected to the positive voltage supply +B through anode resistor 25, bypassed to ground through bypass condenser 96. Anode 95 is furthermore coupled to control grid 88 through blocking condenser 26 and grid coupling condenser 13. The output signal may be derived across cathode resistor 91 and may be obtained by lead 27, filter resistor 60 and blocking condenser 61. It is to be understood that blocking condenser 61 may be connected to the antenna of an amplitude-modulated carrier-wave receiver in the manner illustrated in Fig. 3.

The super-regenerative receiver of Fig. 4 preferably is arranged for receiving an angle-modulated carrier wave. The angle-modulated carrier wave intercepted by antenna 70 is impressed through primary coil 6 on tuned input circuit 7 where it is transformed into a corresponding amplitude-modulated carrier wave. This is effected in the manner described in the Koch patent referred to by tuning input circuit 7 slightly off the center frequency of the carrier wave so that the slope of the resonant curve of circuit 7 will change variations of the frequency of the angle-modulated wave into corresponding variations of its amplitude.

Figure 5:
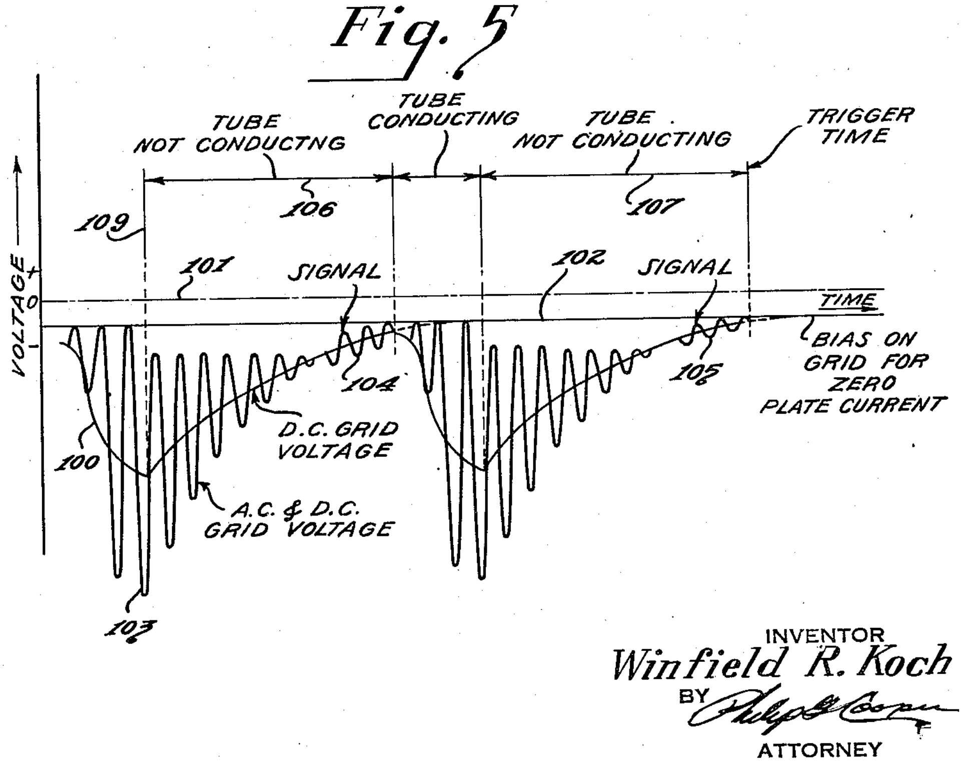
Fig. 5 is a graph showing curves referred to in explaining the operation of the self-quenching regenerative amplifier of Fig. 4.

The operation of self-quenching regenerative amplifier 85 may best be explained by reference to Fig. 5 illustrating the voltage of control grid 88 plotted with respect to time. Let it be assumed that amplifier section 86 is conducting space current. Hence the current flowing through common cathode resistor 91 will cause a voltage drop thereacross which will raise the potential of cathode 93. This will cause termination of the space current through amplifier section 87 with a corresponding rise of the voltage of anode 95. This positive voltage is impressed upon control grid 88 through blocking condenser 26 and grid coupling condenser 13. The positive charge impressed upon coupling condenser 13 is rapidly dissipated by the space current flowing through amplifier section 86 as indicated by curve 100 in Fig. 5. Dash line 101 indicates the zero voltage while line 102 indicates the grid cut-off voltage, that is, the bias voltage required on control grid 88 for zero plate current. It will be noticed that curve 100 represents the direct current voltage of control grid 88 which is below grid cut-off voltage 102. Amplifier section 86, however, is maintained conducting because the sum of the alternating current voltage and of the direct current grid voltage indicated by curve 103 periodically reaches the grid cut-off voltage shown by line 102.

Curve 103 represents the oscillation at the carrier frequency which builds up in input circuit 7. At a certain instant indicated by line 109, the direct current grid voltage becomes so negative with respect to ground that space current can no longer be maintained in amplifier section 86. The potential of cathode 93 accordingly rises again, and amplifier section 87 will now conduct space current. The negative voltage existing at that instant on grid coupling condenser 13 is slowly dissipated through grid leak resistor 92, and condenser 13 is discharged through cathode resistor 91, ground and secondary coil 8. In the meantime, the oscillations previously built up in tuned input circuit 7 are rapidly damped as indicated by curve 103. The time constant of grid coupling condenser 13 and of grid leak resistor 92 is such that the oscillations in input circuit 7 are reduced to a low value before coupling condenser 13 is discharged to such an extent that conduction of amplifier section 86 may be initiated again.

Conduction of amplifier section 86 is initiated again by the input signal, that is, by the angle-modulated carrier wave illustrated in Fig. 5 by curve 104. It is to be understood that input signal 104 is always present on control grid 88 but has only been illustrated during a portion of the quench cycle in order to avoid confusion. As soon as the voltage of input signal 104 reaches grid cut-off voltage 102, amplifier section 86 begins to conduct space current again, and the cycle of operation is repeated.

If during the next quench cycle the amplitude of the input wave is smaller as indicated by curve 105, it will be seen that amplifier section 86 is triggered at a later time during the quench cycle so that the period of time indicated by arrow 106 when amplifier section 86 is not conducting is shorter than the period of time 107 during the next quench cycle when amplifier section 86 is not conducting space current.

It will accordingly be seen that the amplitude of the modulated carrier wave determines the time when amplifier section 86 is triggered and consequently the quench current derived across cathode resistor 91 is frequency modulated. A harmonic of the frequency modulated quench current derived across cathode resistor 91 may be impressed through filter resistor 60 and blocking condenser 61 upon the antenna of an amplitude-modulated carrier-wave receiver in the manner illustrated in Fig. 3.

The super-regenerative receiver of Fig. 4 has the drawback that the tuning of regenerative amplifier input circuit 7 and that of the input circuit of the subsequent radio-frequency amplifier stage which may be tuned by variable condenser 77, are not any more independent. Accordingly, tuned input circuit 7 and the tuned input circuit of the radio-frequency amplifier following the regenerative amplifier must be tuned successively until the modulation signal is properly reproduced.

There has thus been disclosed in Figs. 1 and 3 a separate quench regenerative amplifier which will develop an amplitude-modulated quench current corresponding to the modulated carrier wave impressed upon the receiver. The carrier wave may either have its amplitude modulated in accordance with the modulation signal, or alternatively, an angle-modulated carrier wave may first be transformed directly into a corresponding amplitude-modulated carrier wave which controls the modulation of the quench current. As illustrated in Fig. 1 the amplitude-modulated quench current may be detected to derive the modulation signal. Alternatively, as shown in Fig. 3 a harmonic of the amplitude-modulated quench current may be selected which may be further amplified before being detected. The super-regenerative receiver of Fig. 3 may therefore be used with advantage as an angle-modulated carrier wave adaptor or converter for a conventional amplitude-modulated carrier-wave receiver. Another type of angle-modulated carrier-wave adaptor has been disclosed in Fig. 4. Here, the regenerative amplifier is of the self-quenching type and accordingly develops a frequency-modulated quench current. A harmonic of the quench current may be selected and transformed into a corresponding amplitude-modulated quench wave. This harmonic wave may then be further amplified and detected. The super-regenerative receiver of Fig. 4 may therefore also be used with advantage as an angle-modulated carrier-wave adaptor for an amplitude-modulated carrier-wave receiver.

What is claimed is:

1. A method of demodulating an amplitude-modulated carrier wave which comprises regenerating said wave and interrupting the regeneration periodically at a constant super-audible frequency, controlling the frequency of the developed quench current in accordance with variations of the amplitude of said wave, selecting a harmonic of said frequency-modulated quench current, and demodulating said harmonic to develop the modulation signal.

2. A method of demodulating an angle-modulated carrier wave which comprises translating said angle-modulated carrier wave into a corresponding amplitude-modulated carrier wave, regenerating said amplitude-modulated carrier wave and interrupting the regeneration periodically at a constant frequency, controlling the frequency of the developed quench current in accordance with variations of the amplitude of said amplitude-modulated carrier wave, selecting a harmonic of said frequency-modulated quench current, and demodulating said harmonic to develop the modulation signal.

WINFIELD R. KOCH.

REFERENCES CITED

The following references are of record in the file of this patent:

UNITED STATES PATENTS

| Number | Name | Date |
|---|---|---|
| 1,615,645 | Nyman | Jan. 25, 1927 |
| 2,091,546 | Hruska | Aug. 31, 1937 |
| 2,171,148 | Percival | Aug. 29, 1939 |
| 2,255,668 | Koch | Sept. 9, 1941 |
| 2,410,981 | Koch | Nov. 12, 1946 |
| 2,480,171 | White | Aug. 30, 1949 |

FOREIGN PATENTS

| Number | Country | Date |
|---|---|---|
| 450,150 | Great Britain | July 6, 1936 |

OTHER REFERENCES

Kalmus, Some Notes on Superregeneration, Proc. IRE, October 1944, pages 591 to 600.